United States Patent
Hurst et al.

(10) Patent No.: US 10,317,909 B2
(45) Date of Patent: Jun. 11, 2019

(54) VEHICLE ATTACHMENT POINT POSITIONING IN RELATION TO A VEHICLE ENVIRONMENT

(71) Applicant: Toyota Motor Engineering & Manufacturing North America, Inc., Erlanger, KY (US)

(72) Inventors: Kameron R. Hurst, Sonora, CA (US); Jonathan C. Hall, Ann Arbor, MI (US); Cassandra R. Grant, Saline, MI (US); Frankie B. Reed, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 209 days.

(21) Appl. No.: 15/381,639

(22) Filed: Dec. 16, 2016

(65) Prior Publication Data

US 2018/0173241 A1 Jun. 21, 2018

(51) Int. Cl.
*G05D 1/02* (2006.01)
*G05D 1/00* (2006.01)
(Continued)

(52) U.S. Cl.
CPC ............ *G05D 1/0268* (2013.01); *G01L 5/04* (2013.01); *G01S 17/08* (2013.01); *G01S 17/88* (2013.01); *G05D 1/0011* (2013.01); *B60P 3/38* (2013.01)

(58) Field of Classification Search
CPC .. G05D 1/0268; G05D 1/0214; G05D 1/0225; G05D 1/0276; G05D 2201/02;
(Continued)

(56) References Cited

U.S. PATENT DOCUMENTS 3,021,852 A * 2/1962 Hoffman .................. B60P 3/38
 135/116
3,056,415 A * 10/1962 Nimmo ..................... B60P 3/38
 135/116
(Continued)

OTHER PUBLICATIONS

Unknown, "Finally got to use the whitson rack hammock mounts," web post, (https://www.reddit.com/r/4Runner/comments/3q827a/finally_got_to_use_the_whitson_rack_hammock_mounts/) (undated).
(Continued)

*Primary Examiner* — Bao Long T Nguyen
(74) *Attorney, Agent, or Firm* — Christopher G. Darrow; Darrow Mustafa PC

(57) ABSTRACT

Provided is a method and device for positioning a vehicle attachment point in a vehicle environment. On retrieving a plurality of object parameters relating to an object, a determination is made for a vehicle distance value relative to the vehicle attachment point in order to accommodate an object distance parameter that was retrieved from the plurality of object parameters. A vehicle environment assessment is then made relating to accommodating the physical characteristics of the object and the vehicle associated with the vehicle attachment point. Based on the assessment, vehicle attachment point positional data may be generated for positioning the vehicle attachment point relative to a vehicle environment based on at least the object distance parameter and the vehicle distance value.

20 Claims, 8 Drawing Sheets

(51) Int. Cl.
*G01S 17/08* (2006.01)
*G01L 5/04* (2006.01)
*G01S 17/88* (2006.01)
*B60P 3/38* (2006.01)

(58) Field of Classification Search
CPC ......... G05D 1/0011; G01L 5/04; G01S 17/08; G01S 17/88; B60P 3/38
See application file for complete search history.

(56) References Cited

U.S. PATENT DOCUMENTS

| | | | | |
|---|---|---|---|---|
| 4,522,441 A | * | 6/1985 | Allison | B60P 3/38 135/88.17 |
| 5,738,130 A | | 4/1998 | Thomas | |
| 6,505,873 B1 | | 1/2003 | Crean | |
| 7,309,075 B2 | * | 12/2007 | Ramsey | B60D 1/06 280/477 |
| 8,033,349 B2 | * | 10/2011 | Ortnnann | B60L 11/1818 180/65.1 |
| 8,234,010 B2 | * | 7/2012 | Thompson | G05D 1/0227 318/568.16 |
| 8,552,836 B2 | * | 10/2013 | Pollema | G05D 3/12 244/137.4 |
| 9,072,368 B2 | | 7/2015 | Mueller | |
| 2007/0126395 A1 | * | 6/2007 | Suchar | B60L 1/003 320/109 |
| 2012/0261516 A1 | * | 10/2012 | Gilliland | G01S 17/107 244/183 |
| 2015/0102154 A1 | * | 4/2015 | Duncan | B64C 39/022 244/2 |

OTHER PUBLICATIONS

Eagles Nest Outfitters Inc., Roadie Hammock Stand, (www.eaglesnestoutfittersinc.com/product/ENO-ROADIE.html) (undated).

* cited by examiner

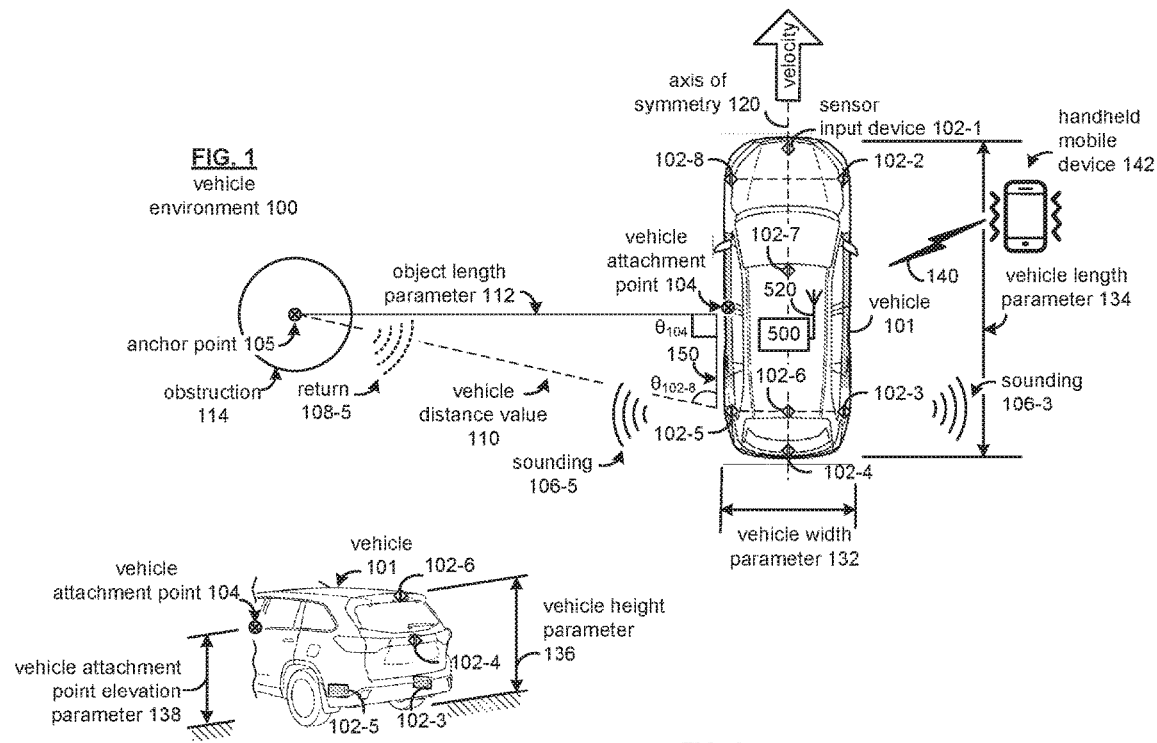

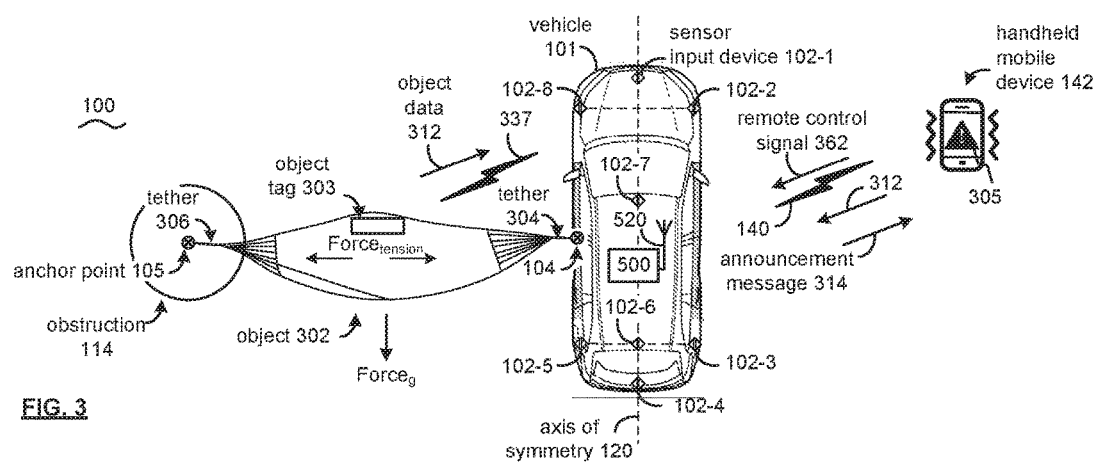
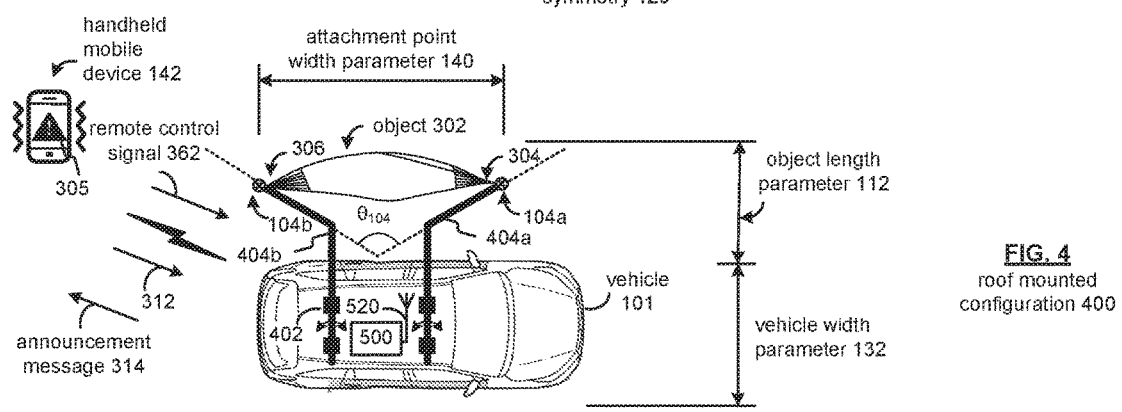
FIG. 4
roof mounted configuration 400 vehicle network 501 object 302 vehicle parameter
data 700 vehicle attachment
point 104 vehicle control unit 500

VEHICLE ATTACHMENT POINT POSITIONING IN RELATION TO A VEHICLE ENVIRONMENT

FIELD

The subject matter described herein relates in general to vehicle attachment point positioning and, more particularly, to the autonomous and/or driver-assisted placement of vehicle attachment point based vehicle input sensor data in view of vehicle and object parameters.

BACKGROUND

Vehicle owners have used their vehicles for recreational and functional activities since cars have available to the consuming public. From providing shelter while camping, to tailgating at sporting events, vehicle owners have made the most of their mobile possession. In the camping context, for example, vehicle owners have used the bumpers, roof racks, door hinges, etc., for tethering hammocks to trees or other objects for relaxation, for providing a quick mount for a corner of a tent for the family, or to suspend tarps for protection from the elements while enjoying a meal outdoors. With advancements in autonomous and/or driver-assist vehicle operation, a desire exists for vehicles to assess a vehicle environment for placement of a vehicle attachment point using technology otherwise assigned to autonomous and/or driver-assist operational modes.

SUMMARY

A device and method for positioning a vehicle attachment point relative to a vehicle environment are disclosed.

In one implementation, a method for positioning a vehicle attachment point is disclosed. In the method a plurality of object parameters relating to an object are retrieved. The object may include at least one tether for removably coupling to the vehicle attachment point. With the parameters, a determination is made for a vehicle distance value relative to the vehicle attachment point in order to accommodate an object distance parameter that was retrieved from the plurality of object parameters. The method continues by assessing a vehicle environment. The vehicle control unit 500 may produce vehicle attachment point positional data, which operates to position the vehicle attachment point relative to a vehicle environment based on at least the object distance parameter and the vehicle distance value.

In another implementation, a vehicle control unit for generating vehicle attachment point positional data for positioning a vehicle attachment point is disclosed. The vehicle control unit including a wireless communication interface, a processor, and a memory. The wireless communication interface operable to service communication with at least a vehicle network and a handheld mobile device of a vehicle user. The processor coupled to the wireless communication interface, and for controlling operations of the vehicle control unit. The memory being coupled to the processor, and for storing data and program instructions used by the processor. The processor being configured to execute instructions stored in the memory to a plurality of object parameters relating to an object are retrieved. The object may include at least one tether for removably coupling to the vehicle attachment point. With the parameters, a determination is made for a vehicle distance value relative to the vehicle attachment point in order to accommodate an object distance parameter that was retrieved from the plurality of object parameters. The method continues by assessing a vehicle environment. The vehicle control unit 500 may produce vehicle attachment point positional data, which operates to position the vehicle attachment point relative to a vehicle environment based on at least the object distance parameter and the vehicle distance value.

BRIEF DESCRIPTION OF THE DRAWINGS

The description makes reference to the accompanying drawings wherein like reference numerals refer to like parts throughout the several views, and wherein:

FIG. 1 is a top view of a vehicle including a vehicle attachment point in an example vehicle environment;

FIG. 2 is a partial rear perspective view of the vehicle of FIG. 1;

FIG. 3 is a schematic illustration of the vehicle of FIG. 1 with an object coupled with a vehicle attachment point;

FIG. 4 is a schematic illustration of a vehicle with a roof mounted configuration including multiple vehicle attachment points;

DETAILED DESCRIPTION

Figure 5:
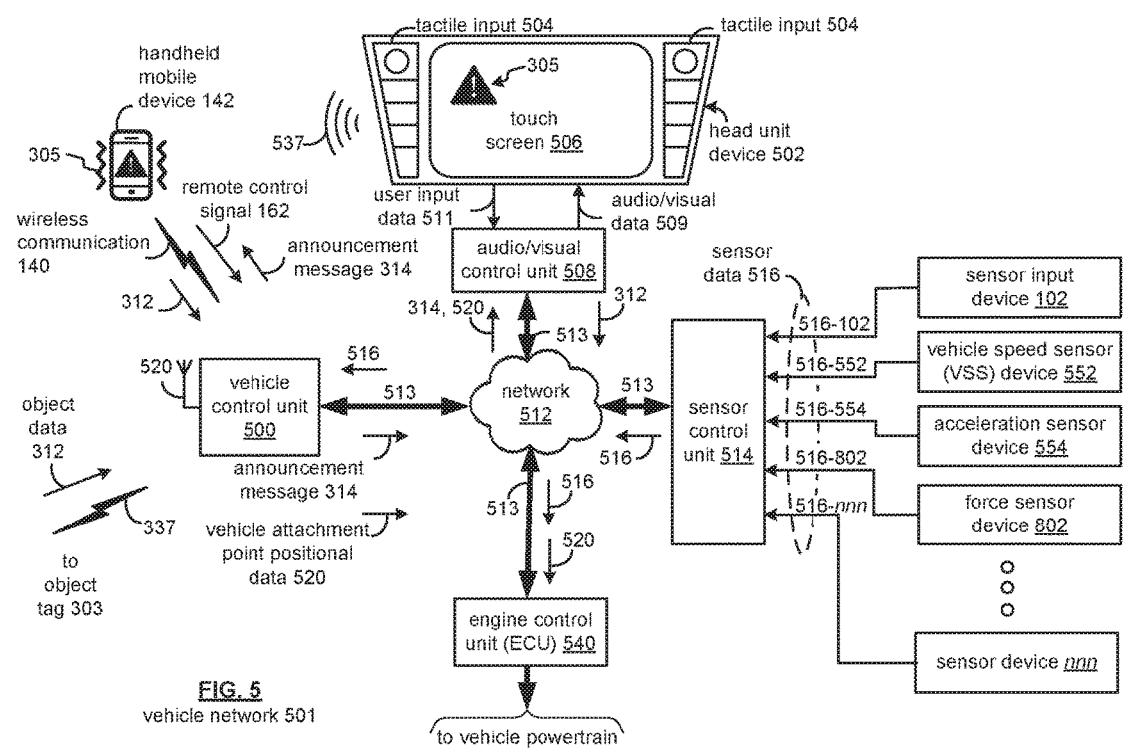
FIG. 5 illustrates a block diagram of a vehicle control unit in the context of a vehicle network environment.

Provided is a device and method for producing vehicle attachment point positional data for positioning a vehicle attachment point for an autonomous, or driver-assist, vehicle. The vehicle attachment point, or points, may be positioned on several sides of a vehicle, and via a vehicle roof attachment device.

The vehicle attachment point may be utilized for removably coupling a tether for a hammock, tent, awning, etc. The vehicle attachment point may be provided on structural columns of the vehicle, such as inside the door frame (for example, a B-Pillar or C-Pillar), or inside the vehicle trunk and/or cargo area that may each be accessed when the trunk or cargo door are opened to provide access.

Existing sensor devices may be utilized to autonomously assess, or assess under a driver-assist vehicle mode, a vehicle environment, and subsequently position the vehicle attachment point so as to allow for the desired object to be removably coupled and/or tethered to the vehicle attachment point. For example, vehicle sensors such as a front collision radar, a back-up radar, LiDAR units, etc., may assess the environment for a selected object. Moreover, additional sensor devices may be added in the factory to supplement the principal autonomous and/or driver-assist sensors.

Vehicle side-sensors may operate, for example, to determine a preferred distance from a natural feature for the purpose of hanging a hammock, or distance available, for setting up camping tents, awnings, etc., that may rely at least partially on the vehicle structure for support.

As may be appreciated, a vehicle may include powered-devices used for transporting people or goods on land, water and/or in air, such as passenger cars, passenger trucks, semi-trucks, cargo vans, emergency or first response vehicles, transport vehicles, trains, recreational water vessels, airplanes, etc.

FIG. 1 is a schematic illustration of a vehicle 101 in an example vehicle environment 100. The vehicle 101 may include a vehicle attachment point 104, a vehicle control unit 500, and a plurality of sensor input devices 102-1, 102-2, 102-3, 102-4, 102-5, 102-6, 102-7 and 102-8 (which collectively may be referred to as sensor input devices 102, or a plurality of sensor devices 102).

For clarity, a singular vehicle attachment 104 is illustrated as located on the driver side of the vehicle 101; however, as may be appreciated, a plurality of attachment points 104 as described in the various embodiments herein may be located on other vehicle sides, roof and/or other vehicle locations as may be considered desirable.

Vehicle attachment point 104 may be mounted to a frame component of the vehicle 101 suitable for supporting weights within an expected range for recreational of medium duty anchor functions (for example, an upper limit of about four-hundred pounds). The vehicle attachment point 104 may be secured by bolting, welding, fabricated in the design of the vehicle structural member, etc.

The vehicle attachment point 104 may further include a force sensor device to sense a force vector exerted on the vehicle attachment point 104, which may be then presented as force sensor device data to the vehicle user via the vehicle control unit 500, as is discussed in detail with reference to FIGS. 2-10.

For the example of FIG. 1, the vehicle attachment point 104 may be positioned at a point adjacent the front driver-side door and the rear driver-side door. The vehicle attachment point 104 may be accessible via a cover plate, or may be positioned within the door frame of the front driver-side door, or in the alternative may be directly accessible at an exterior surface of the vehicle skin.

The plurality of sensor input devices 102 are in communication with the vehicle control unit 500. The plurality of sensor input devices 102 can be positioned on the outer surface of the vehicle 101, or may be positioned in a concealed fashion for aesthetic purposes with regard to the vehicle. Moreover, the sensor input devices 200 may operate at frequencies in which the vehicle body or portions thereof appear transparent to the respective sensor device.

Communication between the sensor input devices 102 may be on a bus basis, and may also be used or operated by other systems of the vehicle 101. For example, the sensor input devices 102 may be coupled by a combination of network architectures such as a Body Electronic Area Network (BEAN), a Controller Area Network (CAN) bus configuration, an Audio Visual Communication-Local Area Network (AVC-LAN) configuration, an automotive Ethernet LAN and/or automotive Wireless LAN configuration, and/or other combinations of additional communication-system architectures to provide communications between devices and systems of the vehicle 101.

The sensor input devices 102 operate to monitor local conditions relating to the vehicle 101. The sensor input devices 102 may provide tactile or relational changes in the ambient conditions of the vehicle 101, such as a person, object, vehicle(s), etc. The one or more of the sensor input devices 102 can be configured to capture changes in velocity, acceleration, and/or distance to these objects, such as obstruction 114, as well as an angle-of-approach, based on an axis-of-symmetry 120 for the vehicle 101.

The sensor input devices 102 may be provided by a Light Detection and Ranging (LIDAR) system, in which the sensor input devices 102 may capture data related to laser light returns from physical objects in the environment 100 of the vehicle 101. Because light moves at a constant speed, LIDAR may be used to determine a distance between a sensor input device 102 and another object with a high degree of accuracy, such as for example, sensor input device 102-5 and obstruction 114.

Also, measurements take into consideration movement of a sensor input device 102 (such as sensor height, location and orientation). Also, GPS location may be used for each of the sensor input devices 102 for determining sensor movement. The sensor input devices 102 may also include a combination of lasers (LIDAR) and milliwave radar devices.

As shown in FIG. 1, the vehicle control unit 500 is configured to provide wireless communication with a user device through the antenna 520, other vehicles (vehicle-to-vehicle), and/or infrastructure (vehicle-to-infrastructure). In the embodiments provided herein, the vehicle control unit 500 may form a wireless communication link 140 with user devices, such as a handheld mobile device 142. The handheld mobile device 142 may operate to provide a graphic user interface (GUI) for selection of an object for coupling with the vehicle attachment point 104. As may be appreciated, on-board devices may also provide such selection interfaces, such as via a head unit device. The handheld mobile device 142 and vehicle on-board devices are discussed in detail with respect to FIGS. 2-10.

The vehicle 101 can also include options for operating in manual mode, autonomous mode, and/or driver-assist mode.

When the vehicle 101 is in a manual mode, the driver manually controls the vehicle systems, which may include a propulsion system, a steering system, a stability control system, a navigation system, an energy system, and any other systems that can control various vehicle functions (such as the vehicle climate or entertainment functions, etc.). The vehicle 101 can also include interfaces for the driver to interact with the vehicle systems, for example, one or more interactive displays, audio systems, voice recognition systems, buttons and/or dials, haptic feedback systems, or any other means for inputting or outputting information.

In an autonomous mode of operation, a computing device, which may be provided by the vehicle control unit 500, or in combination therewith, can be used to control one or more of the vehicle systems without the vehicle user's direct intervention. Some vehicles may also be equipped with a "driver-assist mode," in which operation of the vehicle 101 can be shared between the vehicle user and a computing device.

For example, the vehicle user can control certain aspects of the vehicle operation, such as steering, while the computing device can control other aspects of the vehicle operation, such as braking and acceleration. When the vehicle 101 is operating in autonomous (or driver-assist) mode, the vehicle control unit 500 may issue commands to the various vehicle systems to direct their operation, rather than such vehicle systems being controlled by the vehicle user.

In operation, the example embodiments described herein relate to positioning the vehicle 101 so as to accommodate an object for attachment to the vehicle attachment point 104 of a vehicle 101. In effect, a vehicle environment 100 may be assessed based on a vehicle distance value for accommodating an object's distance parameter, and a vehicle distance value, as may be related to a sensor input device corresponding to a vehicle attachment point 104. Examples of such objects may include a hammock, a slack line, a dog-run tether, a clothes line, a tent, etc.

In FIG. 1, sensor input devices 102 can be configured to capture changes in velocity, acceleration, and/or distance to these objects, such as obstruction 114, as well as an angle-of-approach, based on an axis-of-symmetry 120 for the vehicle 101. Sensor input devices 102-5, 1026, 102-7 and 102-8 corresponding to the vehicle attachment point 104.

In operation, the vehicle control unit 500 operates to retrieve a plurality of object parameters relating to an object. The object includes at least one tether for removably coupling to the vehicle attachment point 104. Examples of objects may include recreational and/or camping items, such as a hammock, a slack line, a dog-run tether, a clothes line, a tent, etc.

The vehicle control unit 500 may determine a vehicle distance value 110 relative to the vehicle attachment point 104 to accommodate an object distance parameter 112 retrieved from the plurality of object parameters. In effect, the object distance parameter 112 relates to a length of an object as extended from the vehicle 101. In the example of a hammock, the object distance parameter 112 relates to a suspension length of the hammock, including a level of "sag" to cradle a person.

The vehicle 101, via the vehicle control unit 500, assesses the vehicle environment 100 via a vehicle-based sensor devices, such as the sensor input device 102-5 in the present simplified example. In operation, the sensor input device 102-5 generates a sounding 106-5, which is answered by a reflected return 108-5, which provides a point cloud that may be analyzed by the vehicle control unit 500 for obstructions and surroundings of the vehicle 101. The vehicle control unit 500 assesses in the simplified example of FIG. 1 the obstruction 114, which may be a tree, a boulder, a building, and/or other form of obstructions that may impede the vehicle 101.

As may be appreciated, the vehicle 101 may be in a wooded area, a cluttered area, a sports tail-gate, etc., that may include varied and plentiful obstructions that may not accommodate the object distance parameter 112, as determined via the vehicle distance value 110 as determined from the vehicle location of the sensor input device 102-5. As the vehicle may travel at a velocity along a path in a wood area, for example, the input sensor device 102-5 may operate to search of regions that accommodate the object distance parameter 112, either in an autonomous mode of operation, or in a driver-assist mode of operation. In the driver-assist mode, a vehicle driver may received feedback as to favorable distances to obstructions, such as obstruction 1114, and capture changes distance to these objects, as well as an angle-of-approach, based on an axis-of-symmetry 120 for the vehicle 101.

In either the autonomous or driver-assist modes of operation, the vehicle control unit 500 operates to position the vehicle attachment point 104 relative to the vehicle environment 100 based on at least the object distance parameter 112 and the vehicle distance value 110. A vehicle attachment point distance parameter 150 relates to a fixed or constant distance relative to the axis-of-symmetry 120 in relation to the vehicle attachment point 104. For example, the distance parameter 150 is the distance of the sensor input device 102-1 relative to the vehicle attachment point 104. As may be appreciated, a sensor input device may be co-located with the vehicle attachment point, in which the distance parameter 150 may effective be a null value.

The object distance parameter 112 relates to the space and/or distance that an object requires for being deployed. In the example of a hammock, the object distance parameter 112, which as discussed above, relates to a suspension length of the hammock, including an amount of "sag" (or tension and/or tautness) to cradle a person or persons. With the given distance parameter 150, the vehicle 101 operates to determine a vehicle distance value 110 and angle value $\theta_{102\text{-}5}$ relative to the vehicle attachment point 104, which may then be used to generate positional data for positioning the vehicle 101.

The object distance parameter 112 is in a vector format, representing a distance relative to the vehicle attachment point 104 and an associated angle-of-attachment $\theta_{104}$. Each of these values may be predetermined, and the vehicle 101, either in an autonomous and/or driver-assist modes of operation, operates to meet the predetermined vector of the object distance parameter 112.

For example, the vehicle distance value 110 is also in a vector format, having a distance component and an angular component $\theta_{102\text{-}5}$ based on the location of the sensor input device 102-5. As may be appreciated, the angle-of-approach, represented by the angular component $\theta_{102\text{-}8}$, may be with reference to the vehicle axis-of-symmetry 120. Accordingly, with an object distance parameter 112 defining a spacing objective distance value and angle value relative to the obstruction 114, the vehicle angle-of-approach $\theta_{102\text{-}5}$ changes as the vehicle approaches the obstruction 114.

In the example where the object 302 is a hammock, the vehicle attachment point 104 may receive a tether for the hammock, with the other tether for the hammock secured to an anchor point 105 provided by the obstruction 114. For convenience, the value for the angle $\theta_{104}$ is represented as 90-degrees within suitable tolerances for the selected object. Accordingly, the vehicle distance value 110 and angle value $\theta_{102\text{-}5}$ have a corresponding relation to the object distance parameter 112 and angle value $\theta_{104}$. Accordingly, the attachment point 104 is positioned relative to these values on an autonomous and/or driver-assist basis to remove human estimation, or guesses, as to achieving the object distance parameter 112 and the desired angle value $\theta_{104}$ for an object selected by the vehicle owner and/or user.

Further, in relation to a space in the vehicle environment 100, the vehicle 101 includes physical dimensions such as a vehicle length parameter 134 and a vehicle body width parameter 132. The sensor input devices 102 may be also provide soundings to avoid damage to the vehicle 101 by other obstructions in the vehicle environment 100.

FIG. 2 is a partial perspective view of the vehicle 101. Other vehicle dimensions considered with regard to assessing the vehicle environment 100 include the elevation of the vehicle attachment point 104, and the vehicle height.

As shown, the vehicle height parameter 136 provides a height value relative to the ground. In this manner, the sensor input device 102-6, 102-7, and 102-1 may assess the vehicle environment 100, in either at a forward and/or reverse velocity, for low hanging obstructions, such as (substantial) tree limbs, rock overhangs, bridge heights, etc. The vehicle attachment point elevation parameter 138 may operate to determine with an obstruction, such as obstruction 114, has a similarly situated anchor point 105 so that an object, such as a hammock, may utilize the anchor point 105 to suspend one of the hammock tethers.

FIG. 3 is a schematic illustration of a vehicle 101 in an example vehicle environment 100 with an object 302. The object 302 has a tether 304 coupled to the attachment point 104, and another tether 306 coupled to anchor point 105 of the obstruction 114.

The example of FIG. 3 illustrates the object 302 as a hammock that may include an object tag, a tether 304, and a tether 306. Also, the object 302 includes a mass, which exerts a downward force ($Force_g$) to the vehicle attachment point 104, and a tensile force ($Force_{tension}$) across the object 302.

The object tag 303 may be a near field communication devices, such as an RFID (radio frequency identification) tag that may include object parameters for the object 302, such as indicating the textile material, physical dimensions (length, width, depth), a tensile strength, a footprint, etc.

Moreover, the object tag 303 may include an object identifier keyed and/or encrypted to the brand of the vehicle 101. For example, object 302 when licensed and/or authorized by the vehicle manufacturer, includes a known quality and reputation for use with the vehicle 101 in the autonomous and/or driver-assist modes of operation, and may already have parameters loaded in the vehicle control unit 500 that may accessed for the processes described herein.

In the event parameters relating to the object 302 may not be stored by the vehicle control unit 500, the vehicle control unit 500 may retrieve the object parameters relating to the object 302 from the object tag 303 via a wireless communication 337. The vehicle control unit 500 may retrieve via object data 312 over the wireless communication 337.

In operation, the vehicle control unit 500 may sense whether the tether 304 of the object 302 is coupled (removably coupled, such as with a note, a carabiner, etc.) to the vehicle attachment point 104. Such sensing may include sensing a force exerted by the object 302 through a tether 304.

The vehicle control unit 500 may sample force sensor device data to determine whether the at least one tether 304 or tether 306 of the object 306 is coupled to the vehicle attachment point 104. As may be appreciated, the force sensor device data corresponds to a force vector applied to the vehicle attachment point 104, as is discussed in detail with reference to FIGS. 4-10.

When the at least one tether 304 or tether 306 of the object 302 is coupled to the vehicle attachment point 104, the vehicle control unite 500 may determine whether the force sensor device data exceeds a predetermined threshold value. In general, the predetermined threshold value may be selected based on the carrying capacity of the object 302 that may be indicated by the object's tensile strength parameter. In the present example of a hammock, the predetermined threshold value may be exceeded when too many people and/or articles are on the hammock.

Another, or a second, predetermined threshold may apply when the vehicle engine and/or power train is started. The second predetermined threshold may have a lower value because when the object 302 remains coupled to the vehicle attachment point 104 as the vehicle 101 moves, damage may result to the object 302 due to excessive tensile force, may strain the vehicle attachment point 104, may cause the anchor point 105 to be brought down on the vehicle 101 or pulled from the ground and dragged by the vehicle (such as, for example, a tree, a temporary pole staked to the ground, a picnic table, etc.), and so on.

When the force sensor device data exceeds the predetermined threshold value (or the another, or second, predetermined threshold value), the vehicle control unit 500 may announce that the force sensor device data exceeds the predetermined threshold value and/or the another predetermined threshold value. Such an announcement may be through an announcement message 314 over wireless communication 140. The handheld mobile device 142 may operate to receive the announcement message 314, and provide visual feedback via a warn icon 305, haptic feedback, audible feedback, or a combination thereof.

Also, with the handheld mobile device 142, a user that may be reclining in an object 302 (for example, a hammock), may adjust the tension and/or tautness of the object 302.

For example, when the vehicle control unit 500 samples the force sensor device data and detects that at least one tether 304 or tether 306 are coupled to the vehicle attachment point 104, the user may transmit the remote control signal 362 over the wireless communication 140 to remotely adjust a tension force ($Force_{tension}$) value through the vehicle attachment point 104.

In operation, the vehicle control unit 500 receives the remote control signal 362, via the antenna 520, which may include a tension force control value. Based on the tension force value, a tension mechanism of the vehicle attachment point 104 may be adjusted, such as an effect length of the attachment point 104, by rotating a tether about a spindle-configuration of the vehicle attachment point 104, and/or a combination thereof. The vehicle control unit 500 may sample the force sensor device data to receive feedback on the tension level, which may be provided in "fuzzy" logic terminology. For example, the force sensor device data may indicate a "very taut" value, a "somewhat taut" value, a slack value, etc.

FIG. 4 is a schematic illustration of a vehicle 101 in an example vehicle environment 100 with an object 302 coupled to multiple vehicle attachment points 104a and 104b via a roof mounted configuration 400.

The vehicle environment 100 is assed to provide a space based on the object distance parameter 112 via sensor input devices 102 (see, e.g., FIG. 1), and an attachment point width parameter 140. As may be appreciated, the angular component $\theta_{104}$ represents a spread of the extension arms 404a and 404b to accommodate the attachment point width parameter 140. Accordingly, obstructions may not be present in the area within the angular component $\theta_{104}$ with respect to an object 302, and extended outward from the vehicle by an object distance parameter 112.

The vehicle attachment points 104a and 104b are extended from a vehicle roof mounted configuration 400. The roof mounted configuration 400 includes mounts 402 to receive arm extensions 404a and 404b. As may be appreciated, each of the arm extensions 404a and 404b may be manually inserted into the mounts 402.

Also, the arm extensions 404a and 404b may be configured to automatically extend outward from the vehicle roof line. In either of the manual or automated configurations, shafts of the arm extensions 404a and 404b may be keyed and inserted in the mounts 402 to provide a fixed relation of the vehicle attachment points 104a and 104b with one another for suspension of the object 302, such as a hammock, clothesline, etc. Moreover, a set of the mounts 402 for either of the arm extensions 404a and 404b may remotely rotate a respective vehicle attachment point 104a and/or 104b to adjust a tension force of the object 302.

As shown, the vehicle attachment points 104a and 104b may be splayed outward by a bend of the respective arm extensions 404a and/or 404b. Though shown has being substantially mirror images of one another, other configurations may be implemented to achieve providing vehicle attachment points 104a and 104b to receive respective tethers 304 and 306 of the object 302.

Also, with the handheld mobile device 142, a user that may be reclining in an object 302 (for example, a hammock), may remotely adjust the tension and/or tautness of the object 302.

For example, when the vehicle control unit 500 samples the force sensor device data and detects that at least one tether 304 or tether 306 are coupled to the vehicle attachment point 104, the user may transmit the remote control signal 362 over the wireless communication 140 to remotely adjust a tension force (Force$_{tension}$) value through either and/or both of the vehicle attachment points 104a and 104b.

In operation, the vehicle control unit 500 receives the remote control signal 362, via the antenna 520, which may include a tension force control value. Based on the tension force value, a tension mechanism of the vehicle attachment point 104 may be adjusted, such as increasing or decreasing an effective length of the attachment point 104, by rotating a tether about a spindle-configuration of either of the vehicle attachment points 104a and/or 104b, by rotating either of the extension arms 404a and/or 404b, and/or a combination thereof.

The vehicle control unit 500 may sample the force sensor device data to receive feedback on the tension level provided by the user via the handheld mobile device 142, which may be provided in "fuzzy" logic terminology. For example, the force sensor device data may indicate a "very taut" value, a "somewhat taut" value, a slack value, etc.

Referring now to FIG. 5, a block diagram of a vehicle control unit 500 in the context of a vehicle network environment 201 is provided. While the vehicle control unit 500 is depicted in abstract with other vehicular components, the vehicle control unit 500 may be combined with the system components of the vehicle 101 (see FIG. 1). Moreover, the vehicle 101 may also be an automobile or any other passenger or non-passenger vehicle such as, for example, a terrestrial, aquatic, and/or airborne vehicle.

As shown in FIG. 5, the vehicle control unit 500 communicates with a head unit device 502 via a communication path 513, and may also be wirelessly coupled with other devices via the antenna 220 and wireless communications 140 and 337.

The vehicle control unit 500 is operable to retrieve location data for the vehicle 101, via a global positioning satellite (GPS) data. Moreover, handheld mobile devices may also be communicatively coupled to the network 512 via wireless communication 140, such as a handheld mobile device 142 (for example, cell phone, a smart phone, a personal digital assistant (PDA) devices, tablet computer, e-readers, etc.).

Through the sensor control unit 514, the vehicle control unit 500 may access sensor data 516-102 of the sensor input device 102, sensor data 516-552 of the vehicle speed sensor (VSS) device 552, sensor data 516-554 of the acceleration sensor device 554, sensor data 516-802 of the force sensor device 802 relating to the vehicle attachment point 104 (see, e.g., FIGS. 1-4), and additional useful sensor data 516-nnn of sensor devices nnn, as further technologies and configurations may be available.

The sensor data 516 operates to permit obstacle detection and space in a vehicle environment, such as for example, other vehicles, obstructions, signs, trees, boulders, etc. Accordingly, the sensor data 516 allow the vehicle 101 (see FIG. 1) to assess its environment in order to facilitate placement of the vehicle access point 104 based on vehicle parameter data and object identifiers and associated object parameters.

In either of an autonomous or driver-assist mode of operation, the vehicle control unit 500 operates to position a vehicle attachment point 104 relative to the vehicle environment 100 based on at least the object distance parameter 112 and the vehicle distance value 110 (see FIG. 1). For example, the distance parameter 150 is the distance of the sensor input device 102-1 based on sensor data 516-102-1 relative to a vehicle attachment point 104.

With the sensor data 516, the vehicle control unit 500 may operate to identify obstructions within a vehicle environment, and position a vehicle attachment point 104 to facilitate a selected object (such as a hammock, a slack line, a dog-run tether, a clothes line, a tent, etc.).

The vehicle control unit 500 may sample the sensor data 516, receive object 312 via a wireless communication 337, or wireless communication 140 from a handheld mobile device 142. The vehicle control unit 500, based on the sensor input device data 516-102 may generate a vehicle attachment point positional data 520, which may be provided to an engine control unit (ECU) 540 via the network 512 through the communication path(es) 513, and also to audio/visual control unit 508. The engine control unit (ECU) 540 may operate to produce control data based on the vehicle attachment point positional data 520 to transmit to vehicle power train actuators.

The term "power train" as used herein describes vehicle components that generate power and deliver the power to the road surface, water, or air. The power train may include the engine, transmission, drive shafts, differentials, and the final drive communicating the power to motion (for example, drive wheels, continuous track as in military tanks or caterpillar tractors, propeller, etc.). Also, the power train may include steering wheel angle control, either through a physical steering wheel of the vehicle 101, or via drive-by-wire and/or drive-by-light actuators.

Still referring to FIG. 5, the head unit device 502 includes, for example, tactile input 504 and a touch screen 506. The touch screen 506 operates to provide visual output or graphic user interfaces such as, for example, maps, navigation, entertainment, information, infotainment, and/or combinations thereof. For example, when the vehicle control unit 500 generates an announcement message 314 and/or vehicle attachment point positional data 520, the audio/visual control unit 508 may generate audio/visual data 509 that displays a warning icons 305 based on the forces exerted to a vehicle attachment point 104, as indicated by force sensor device data 516-802, and/or a display indicating position of the vehicle attachment point 104, via the vehicle 101, in a vehicle environment. Such display of the positional data 520 may be provided feedback information to a vehicle user when the vehicle 101 operates in an autonomous mode, or may provide visual and/or audible guidance to a vehicle user when the vehicle 101 operations in a driver-assist mode. In effect, the ease with which the vehicle attachment point 104 may be positioned in the vehicle environment is enhances the user's experience through the feedback provided via the vehicle control unit 500 with the positional data 520.

The touch screen 506 may include mediums capable of transmitting an optical and/or visual output such as, for example, a cathode ray tube, light emitting diodes, a liquid crystal display, a plasma display, etc. Moreover, the touch screen 506 may, in addition to providing visual information, detect the presence and location of a tactile input upon a surface of or adjacent to the display. Accordingly, the display may receive mechanical input directly upon the visual output provided by the touch screen 506. Additionally, it is noted that the touch screen 506 can include at least one or more processors and one or more memory modules. Touch screen 506 may include a display screen, such as a liquid crystal display (LCD), light emitting diode (LED), plasma display or other two dimensional or three dimensional display that displays graphics, text or video in either monochrome or color in response to display data audio/visual data 509.

The head unit device 502 may also include tactile input and/or control inputs such that the communication path 513 communicatively couples the tactile input to other control units and/or modules of the vehicle 101 (see FIG. 1). Tactile input data may provided by devices capable of transforming mechanical, optical, or electrical signals into a data signal capable of being transmitted via the communication path 513. The tactile input 504 may include number of movable objects that each transform physical motion into a data signal that can be transmitted over the communication path 513 such as, for example, a button, a switch, a knob, a microphone, etc.

The touch screen 506 and the tactile input 204 may be combined as a single module, and may operate as an audio head unit or an infotainment system of the vehicle 101. The touch screen 506 and the tactile input 504 can be separate from one another and operate as a single module by exchanging signals via the communication path 513.

As may be appreciated, the communication path 513 of the vehicle network 512 may be formed a medium suitable for transmitting a signal such as, for example, conductive wires, conductive traces, optical waveguides, or the like. Moreover, the communication path 513 can be formed from a combination of mediums capable of transmitting signals. In one embodiment, the communication path 513 can include a combination of conductive traces, conductive wires, connectors, and buses that cooperate to permit the transmission of electrical data signals to components such as processors, memories, sensors, input devices, output devices, and communication devices.

Accordingly, the communication path 513 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, a vehicle Ethernet LAN, a vehicle wireless LAN and/or other combinations of additional communication-system architectures to provide communications between devices and systems of the vehicle 101.

The term "signal" relates to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

The vehicle network 512 may be communicatively coupled to receive signals from global positioning system satellites, such as via the antenna 520 of the vehicle control unit 500, or other such vehicle antenna (not shown). The antenna 520 may include one or more conductive elements that interact with electromagnetic signals transmitted by global positioning system satellites. The received signals may be transformed into a data signal indicative of the location (for example, latitude and longitude positions), and further indicative of the positioning of the vehicle with respect to road data, in which a vehicle position can be indicated on a map displayed via the touch screen 506.

The wireless communication 140 and 337 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multipoint distribution systems), MMDS (multi-channel-multipoint distribution systems), IrDA, Wireless USB, Z-Wave, ZigBee, and/or variations thereof.

The vehicle control unit 500 may be communicatively coupled to a handheld mobile device 142 via wireless communication 140, an object tag 303, etc. Object data 312 may be provided to the vehicle control unit 500 from various applications running and/or executing on wireless platforms of the handheld mobile device 142, as well as from the object tag 303 via the wireless communication 337, when the object data 303 may not be stored and/or resident with the vehicle control unit 500.

The handheld mobile device 142 by way of example, may be a device including hardware (for example, chipsets, processors, memory, etc.) for communicatively coupling with the network cloud 518, and also include an antenna for communicating over one or more of the wireless computer networks described herein.

Figure 6:
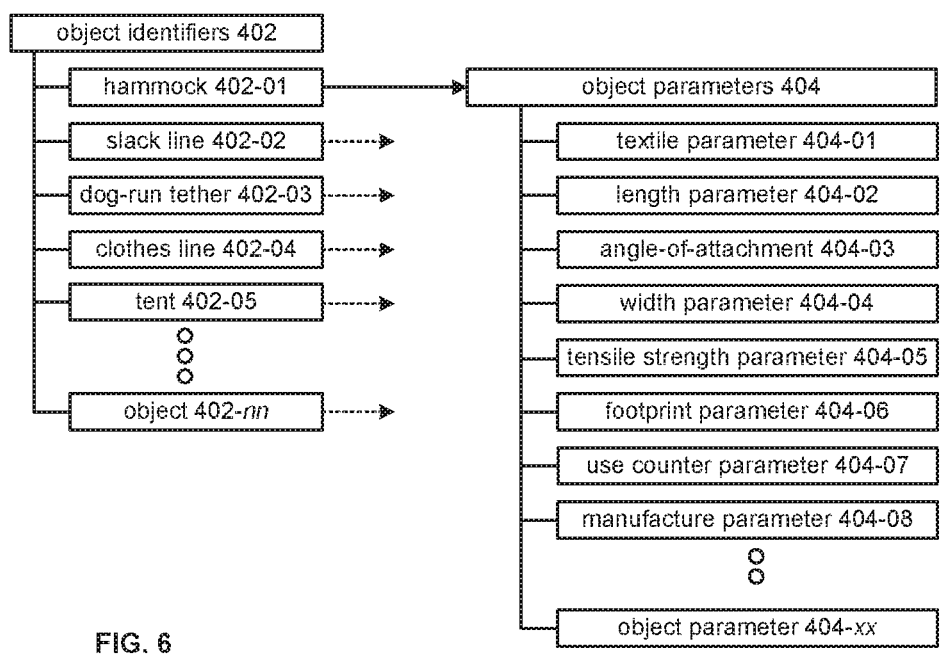
FIG. 6 is a block diagram of object information relating to an object for coupling to a vehicle attachment point.

FIG. 6 is a block diagram of information relating to an object 302. An object 302 may be identified by object identifiers 402, which may include a plurality of object parameters 404. For example, the object identifiers 402 may include object identifiers for a hammock 402-01, a slack line 402-02, a dug-run tether 402-03, a clothes line 402-04, a tent 402-05, and other identifiers for additional objects 402-nn.

As may be appreciated, the object(s) 302 of the object identifiers 402 each include at least one tether for coupling with a vehicle attachment point 104 as described with respect to FIGS. 1-4. The tether may be formed from the material of the object, such as with a slack line 402-02 and/or a clothes line 402-04, or may have characteristics departing from those of the body of the object 302, such as with a hammock 402-01, tent 402-05, etc.

Each of the object identifiers 402 has an associated plurality of object parameters 404. For the example of a hammock identifier 402-01, the object parameters 404 may include a textile parameter 404-01, a length parameter 404-02, an angle-of-attachment parameter 404-03, a width parameter 404-04, a tensile strength parameter 404-05, a footprint parameter 404-06, and additional parameter 404-xx as may be included (such as a style of hammock, a use-counter parameter, a manufacturer parameter, etc.).

Parameters relate to an area requirement of the object 302, such as length parameter 404-02, angle-of-attachment parameter, width parameter 404-03, and footprint parameter 404-05. These parameters indicate an area requirement for the object 302, and desired angular attachment with respect to the vehicle 101 when a tether of the object is coupled to the vehicle attachment point 104. The length parameter 404-112, values indicate a distance from the vehicle attachment point 104 (see FIGS. 1-4).

The textile parameter 404-01 and the tensile strength parameter 404-05 relate to characteristics of the object 302, and relative strength of the materials construct. Moreover, the vehicle control unit 500 may track a usage rate of an object 302 as a wear indication, a deterioration indication (due to exposure to the elements (such as ultraviolet, sun, water, wind, excessive strain, etc.)). Upon reaching a threshold, the vehicle control unit 500 may alert a user that a replacement for an object may be due.

Additionally, in view of multiple vehicle attachment points 104 for multiple objects 302, individual user objects 302 may be identified electronically via the object tag 303, as well as noting which object 302 is mounted to which vehicle attachment point 104.

In addition to object data 312, the object tag 303 (see FIGS. 1 & 3) may further include a manufacture date and brand designation for an object 302 that may be stored with the object identifiers 402 and the object parameters 404. Such information may include whether an object 302 is an original-equipment-manufacturer (OEM) article. An OEM may be understood to be a company and/or entity that makes a part, subsystem, accessory, etc. that may be used with another company's and/or entity's end product, such as a vehicle. Such information may be provided in a selection graphic user interface (GUI) to a user via a handheld mobile device 142, a head unit device 502 (see FIG. 5) for selection of the object 302 via object identifiers 402 for use with the vehicle attachment point(s) 104. In the alternative, object identifiers 402 and object parameters 404 may be entered manually via a GUI interface of the head unit device 502, the handheld mobile device 142, etc., and stored via the vehicle control unit 500.

Figure 7:
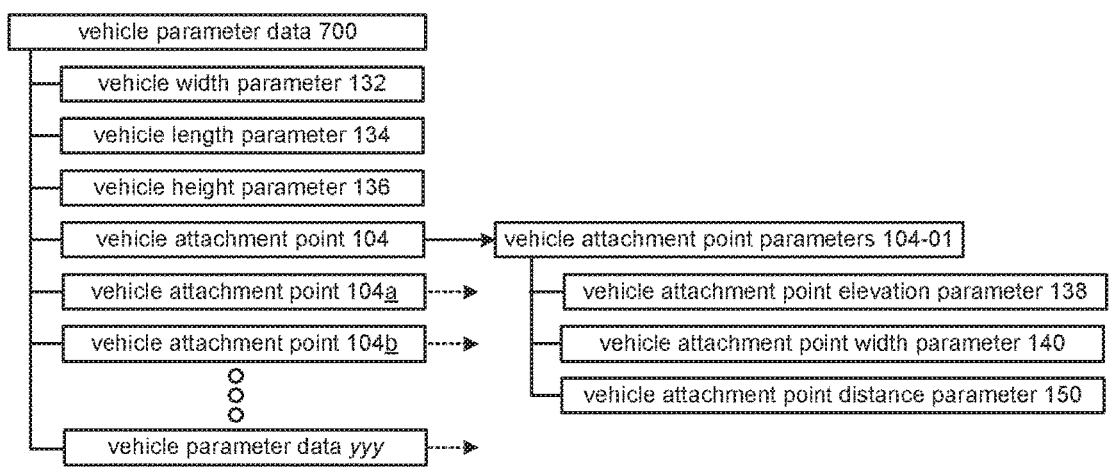
FIG. 7 is a block diagram of vehicle parameter data as relating to a vehicle attachment point and/or attachment points.

FIG. 7 is a block diagram of vehicle parameter data 700 as relating to a vehicle attachment point 104 and/or attachment points 104, 104a, 104b, etc.

The vehicle parameter data 700 relates to coupling data for the vehicle attachment point 104, and to dimensions of the vehicle 101 (see FIGS. 1-4). The vehicle parameter data 700 may include a vehicle width parameter 132, a vehicle length parameters 134, and a vehicle height parameter 136.

With respect to a vehicle attachment points 104, the vehicle parameter data 700 may include one or many vehicle attachment points 104. For example, a vehicle 101 may include a vehicle attachment point 104, which may suspend a hammock from the at least one tether coupled to the vehicle attachment point 104, and another tether to an anchor from another object (such as a tree, a rock, another vehicle, etc.). The vehicle 101 may also include another similar vehicle attachment point elsewhere on the vehicle, or a roof mounted configuration 400 (see FIG. 3). The vehicle parameter data 700 would include corresponding parameters for each of the vehicle attachment points. For example, the vehicle parameter data 700 may include identifiers for vehicle attachment point 104, 104a, and 104b, which may be displayed graphically to a vehicle user for selection of one or all of the attachment points (in which event, the object 302 of FIG. 6 with the greatest relative footprint and associated vehicle attachment point would govern placement of the attachment vehicle point via the vehicle 101).

In the example of FIG. 7, the vehicle attachment point 104 further includes a vehicle attachment point elevation parameter 138, a vehicle attachment point width parameter 140, and a vehicle attachment point distance parameter 150. As may be appreciated, a sensor input device may be co-located with the vehicle attachment point, in which the distance parameter 150 may effective be a null value. Further, in the context of paired attachment points, such as 104a and 104b (see FIG. 3), the parameters may further include such relational attachment point data. the data 700 conveys the distance from the ground of an attachment point (parameter 138), the extent the attachment point may extend beyond or be contained within a vehicle skin (parameter 140), and the relative location of the vehicle attachment point 104 to a respective input sensor device 102 (see, e.g., FIG. 1) for determination of a vehicle distance value with respect to a selected object (see FIG. 6).

Figure 8:
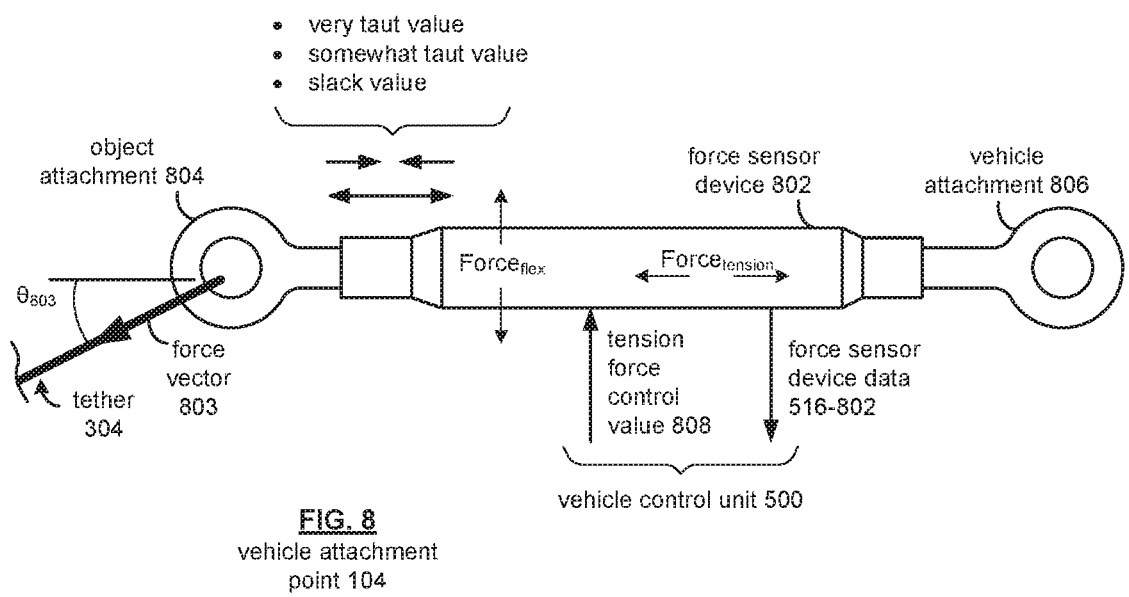
FIG. 8 is a schematic view of a vehicle attachment point.

Referring now to FIG. 8, a schematic view of an attachment point 104 is shown. The attachment point 104 may include an object attachment 804 for attachment to a tether 304 of an object 302, a vehicle attachment 806 for attachment to a vehicle 101, and a force sensor device 802 therebetween.

As may be appreciated, the vehicle attachment point 104 of FIG. 8 is to relay general force sensing at an attachment point 104, with the understanding that various configurations may be deployed to provide an object attachment including a tensile force and/or flex force exertion to the attachment point 104.

In the embodiment depicted, the vehicle attachment 806 may receive a bolt at vehicle attachment 806 to mount to a vehicle frame, and in this manner may move freely about the bolt as well as detachably stowed when not in use. Further, the communication with a vehicle control unit 300 may occur wirelessly in such a context, via antenna 520 of the vehicle control unit 500 (see, e.g., FIGS. 1-5).

As another example, the vehicle attachment 806 may be fixed to a vehicle frame or other such support surface, with the force sensor device 802 and object attachment 804 being removably secured to the cylinder rod of the vehicle attachment 806 by a pin assembly. Moreover, a compact configuration may be accessed via a panel plate on the vehicle skin to access the object attachment 804 portion. Other such configurations may be implemented.

In the example of the embodiment shown by FIG. 8, the vehicle control unit 500 may access the force sensor device data 516-802 to provide the method and or device described herein, as well as to provide a tension force control value 808.

For generating force sensor device data 516-802, the vehicle attachment point 104 includes a force sensor device 802, which may include a force sensing transducer aligned to register tensile forces ($For_{cetension}$) and flex forces ($Force_{flex}$) orthogonal to an axis-of-symmetry of the vehicle attachment point 104. By registering the forces exerted to the vehicle attachment point 104, a force vector 803 and associated angle component $\theta_{803}$, relative to the vehicle attachment point 104, may produce force sensor device data 516-802. The data 516-802 may be received by the vehicle control unit 300 via the vehicle network 501 (see FIG. 5).

In operation, the vehicle control unit 500 may sample the force sensor device data 516-802 to determine whether the at least one tether 304 of an object 302 is coupled to the vehicle attachment point 104 via the object attachment 804. When the object 302 is so coupled to the vehicle attachment point 104, the vehicle control unit 500 may determine whether the force vector 803 and associated angle $\theta_{803}$, via force sensor device data 516-802, exceeds a predetermined threshold value of the object 302 and/or of the vehicle attachment point 104.

Moreover, in operation, the vehicle control unit 500 receives the remote control signal 362, via the antenna 520, which may include a tension force control value 808 (see, e.g., FIGS. 1-5). Based on the tension force value 808, a tension mechanism of the vehicle attachment point 104 may be adjusted, such as adjusting an effective length of the attachment point 104, by rotating the tether 304 about a spindle-configuration of the vehicle attachment point 104 mounted within the void of object attachment 804. A spindle of such sort may be operated on a hydraulic, gear-motor, ratchet and/or other mechanism to impart rotation to a spindle component or to increase/decrease a length of a vehicle attachment point 104.

The vehicle control unit 500 may sample the force sensor device data 802 to receive feedback on a tension level via the tether 304. The tension level may be on a "fuzzy" logic basis, as suitable tensions levels may differ for different users. For example, the force sensor device data may indicate a "very taut" value, a "somewhat taut" value, a slack value, etc.

Figure 9:
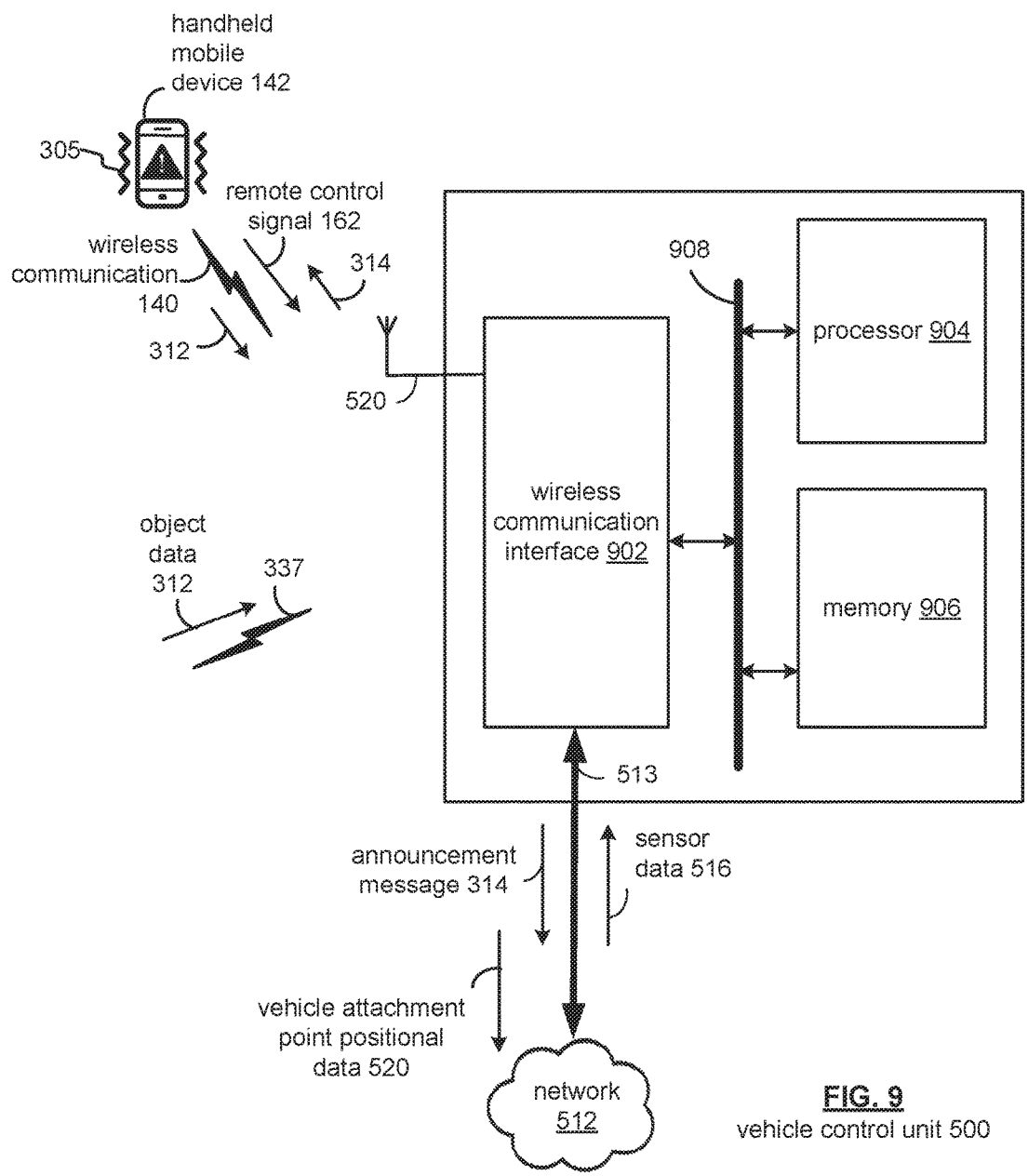
FIG. 9 is a block diagram of a vehicle control unit.

FIG. 9 is a block diagram of a vehicle control unit 500, which includes a wireless communication interface 902, a processor 904, and memory 906, that are communicatively coupled via a bus 908.

The processor 904 of the control unit 500 can be a conventional central processing unit or any other type of device, or multiple devices, capable of manipulating or processing information. As may be appreciated, processor 904 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element 906 may be a single memory device, a plurality of memory devices, and/or embedded circuitry of the processing module 904. Such a memory device may be a read-only memory, random access memory, volatile memory, non-volatile memory, static memory, dynamic memory, flash memory, cache memory, and/or any device that stores digital information. The memory 906 is capable of storing machine readable instructions such that the machine readable instructions can be accessed by the processor 904. The machine readable instructions can comprise logic or algorithm(s) written in programming languages, and generations thereof, (e.g., 1GL, 2GL, 3GL, 4GL, or 5GL) such as, for example, machine language that may be directly executed by the processor 904, or assembly language, object-oriented programming (OOP), scripting languages, microcode, etc., that may be compiled or assembled into machine readable instructions and stored on the memory 906. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 904 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 904 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 904 executes, hard coded and/or operational instructions corresponding to at least some of the steps and/or functions illustrated in FIGS. 1-10 for positioning a vehicle attachment point and methods described herein.

The wireless communication interface 902 generally governs and manages the vehicle user input data via the vehicle network 512 over the communication path 513 and/or wireless communication 140 and/or 337.

The wireless communication interface 902 also manages controller unit output and input data such as the announcement message 314, the vehicle attachment point positional data 520, sensor data 516, and data requests/receipt, such as object data 312.

There is no restriction on the present disclosure operating on any particular hardware arrangement and therefore the basic features herein may be substituted, removed, added to, or otherwise modified for improved hardware and/or firmware arrangements as they may develop.

The sensor data 516 includes capturing of intensity or reflectivity returns of the environment surrounding the vehicle, and relative distance of vehicles. In general, data captured by the sensor input devices 102 provided to the vehicle control unit 500 via the communication path 513 can be used by one or more of applications of the vehicle to determine the vehicle environment, and to also sense improved positional accuracy with distances relating to the vehicle attachment point or points.

The vehicle control unit 500 functions to retrieve a plurality of object parameters relating to an object. The object includes at least one tether for removably coupling to a vehicle attachment point 104. Examples of objects may include recreational and/or camping items, such as a hammock, a slack line, a dog-run tether, a clothes line, a tent, etc.

The vehicle control unit 500 may determine a vehicle distance value relative to the vehicle attachment point to accommodate an object distance parameter retrieved from the plurality of object parameters that may be stored with memory 906, or in the alternative received as object data 312 via a handheld mobile device 142, an object tag 303 (see, e.g., FIGS. 3 and 4). In effect, the object distance parameter relates to a length of an object as extended from the vehicle attachment point, as attached to a vehicle. In the example of a hammock, the object distance parameter relates to a suspension length of the hammock, including a level of "sag" to cradle a person.

The vehicle control unit 500 may assess a vehicle environment via vehicle-based sensor devices, such as the sensor input devices 102-5 via sensor data 516 in the present simplified example.

In either the autonomous or driver-assist modes of operation, the vehicle control unit 500 may produce vehicle attachment point positional data for positioning the vehicle attachment point relative to a vehicle environment based on at least the object distance parameter and the vehicle distance value, as is discussed in detail with reference to FIGS. 1-10.

Figure 10:
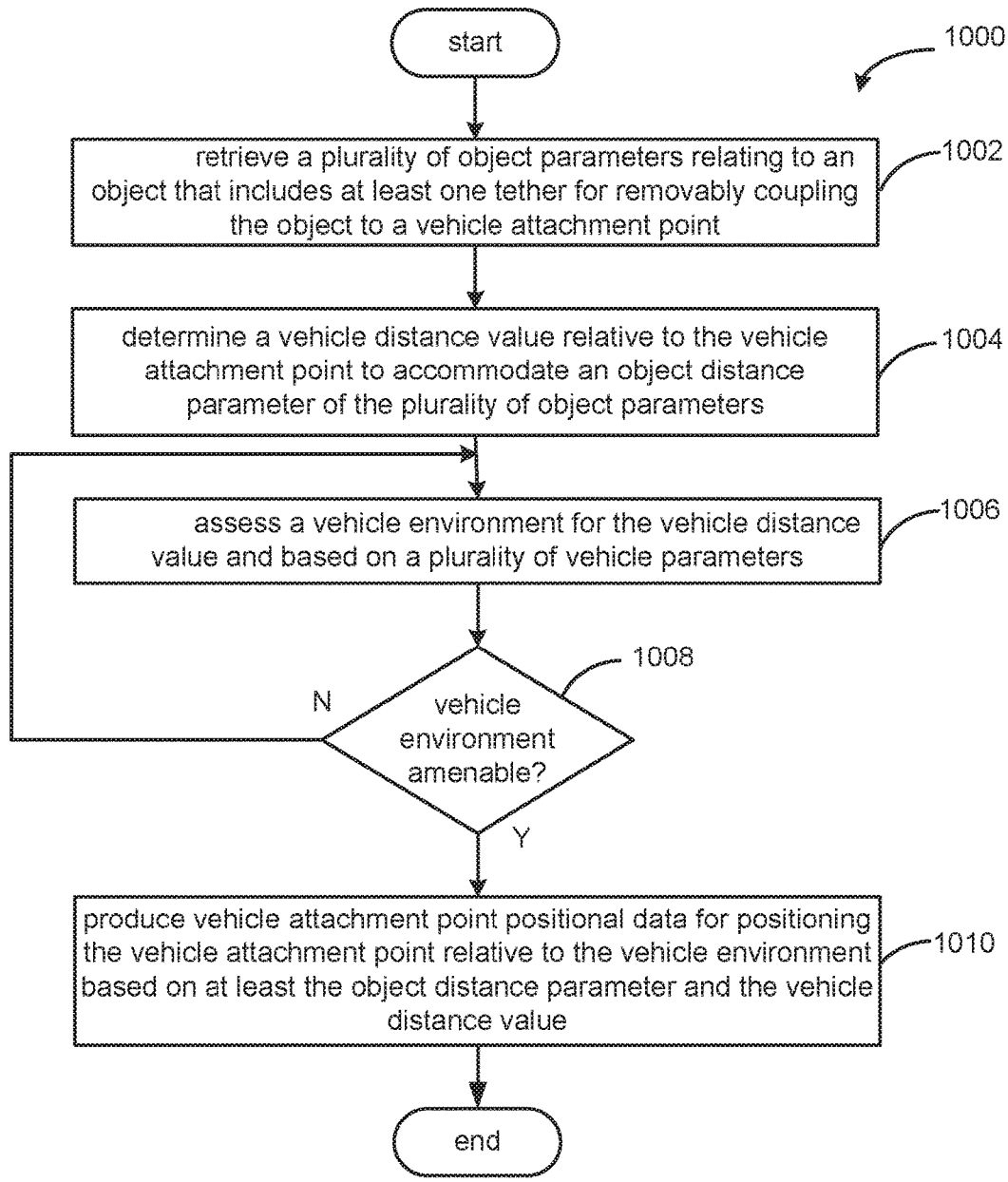
FIG. 10 shows an example process for positioning a vehicle attachment point.

FIG. 10 shows an example process 1000 for positioning a vehicle attachment point. At operation 1002, a vehicle control unit retrieves a plurality of object parameters relating to an object that includes at least one tether for removably coupling the object to a vehicle attachment point. An object may be considered to be an article of manufacture, OEM or otherwise in origin, that includes a tether that may couple to the vehicle attachment point for use of the object. Examples of objects may include a hammock, a slack line, a dog-run tether, a clothes line, a tent, etc.

At operation 1004, a vehicle distance value relative to the vehicle attachment point is determined for accommodating an object distance parameter of the plurality of object parameters. That is, relative to the vehicle attachment point, the distance being determined is for accommodating the object when coupled to the vehicle attachment point. With these determination, the method at operation 1006 assesses a vehicle environment for the vehicle distance value and based on a plurality of vehicle parameters. The assessment may be based on a vehicle-based sensor device, which may be in a spaced-apart relation to the vehicle attachment point. As may be appreciated, such assessments and positioning may be based on sensor devices that had been allocated for autonomous and/or driver-assist driving functions, but alternatively, are temporarily repurposed for recreational and leisure pursuits.

When the assessment at operation 1008 indicates that the vehicle environment is amenable, the vehicle control unit at operation 1010 produces vehicle attachment point positional data for positing the vehicle attachment point relative to the vehicle environment based on at least the object distance parameter and the vehicle distance value.

When vehicle environment is not amenable to the object as coupled to the vehicle attachment point, including the area and/or volume occupied by the vehicle 101 of the vehicle attachment point, the vehicle may continue moving forward or in reverse to assess a different vehicle environment resulting from the movement of the vehicle at operation 1006 until a suitable vehicle environment is found.

While particular combinations of various functions and features of the present invention have been expressly described herein, other combinations of these features and functions are possible that are not limited by the particular examples disclosed herein are expressly incorporated within the scope of the present invention.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

Thus, there has been described herein a device and method, as well as several embodiments including a preferred embodiment, for positioning a vehicle attachment point in a vehicle environment.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method for positioning a vehicle attachment point comprising:
   retrieving a plurality of object parameters relating to an object that includes at least one tether for removably coupling the object to the vehicle attachment point;
   determining a vehicle distance value relative to the vehicle attachment point to accommodate an object distance parameter of the plurality of object parameters;
   assessing a vehicle environment, via a vehicle-based sensor device, for the vehicle distance value and based on a plurality of vehicle parameters; and
   producing vehicle attachment point positional data for positioning the vehicle attachment point relative to the vehicle environment based on at least the object distance parameter and the vehicle distance value.

2. The method of claim 1, further comprising:
   sampling force sensor device data to determine whether the at least one tether of the object is coupled to the vehicle attachment point, wherein the force sensor device data corresponds to a force vector applied to the vehicle attachment point;
   when the at least one tether of the object is coupled to the vehicle attachment point, determining whether the force sensor device data exceeds a predetermined threshold value; and
   when the force sensor device data exceeds a predetermined threshold value, announcing that the force sensor device data exceeds the predetermined threshold value.

3. The method of claim 2, wherein the predetermined threshold value is based on a tensile strength parameter of the plurality of object parameters.

4. The method of claim 1 further comprising:
   when the at least one tether of the object is coupled to the vehicle attachment point, adjusting a tension force value to the object through the vehicle attachment point.

5. The method of claim 4, wherein the adjusting the tension force value to the object comprises:
   receiving a remote control signal including a tension force control value; and
   adjusting the tension force value to the object based on the tension force control value and a feedback of force sensor device data at the vehicle attachment point.

6. The method of claim 5, wherein the force sensor device data comprises at least one of:
   a very taut value;
   a somewhat taut value; and
   a slack value.

7. The method of claim 1, wherein the plurality of object parameters relating to the object comprises:
   a textile parameter;
   a length parameter;
   a width parameter;

a tensile strength parameter;
a footprint parameter;
a use-counter parameter; and
a manufacturer parameter.

8. The method of claim 1, wherein the plurality of vehicle parameters comprises:
a vehicle width parameter;
a vehicle length parameter;
a vehicle height parameter;
a vehicle attachment point elevation parameter; and
a vehicle attachment point distance parameter.

9. The method of claim 1, wherein the object comprises at least one of:
a hammock;
a slack line;
a dog-run tether;
a clothes line; and
a tent.

10. A method for positioning a vehicle attachment point comprising:
retrieving a plurality of object parameter data relating to an object that includes at least one tether for removably coupling the object to the vehicle attachment point;
sensing suitability of an area based on the plurality of object parameter data and a plurality of vehicle parameter data, wherein when the area is suitable:
determining a vehicle distance value relative to the vehicle attachment point to accommodate object distance parameter data of the plurality of object parameter data; and
autonomously positioning the vehicle attachment point relative to a vehicle environment based on at least the object distance parameter data of the plurality of object parameter data and the plurality of vehicle parameter data.

11. The method of claim 10, further comprising:
sensing whether the at least one tether of the object is removably coupled to the vehicle attachment point;
when the at least one tether of the object is removably coupled to the vehicle attachment point, sensing a force vector at the vehicle attachment point and producing force vector data; and
when the force vector data exceeds a predetermined threshold value, announcing that the force vector data exceeds the predetermined threshold value.

12. The method of claim 11, wherein the predetermined threshold value is based on a tensile strength parameter of the plurality of object parameter data.

13. The method of claim 10, wherein the plurality of object parameter data comprises:
a textile parameter;
a length parameter;
a width parameter;
a tensile strength parameter;
a footprint parameter;
a use-counter parameter; and
a manufacturer parameter.

14. The method of claim 10, wherein the plurality of vehicle parameter data comprises:
a vehicle width parameter;
a vehicle length parameter;
a vehicle height parameter;
a vehicle attachment point elevation parameter; and
a vehicle attachment point distance parameter.

15. The method of claim 10, wherein the object comprises at least one of:
a hammock;
a slack line;
a dog-run tether;
a clothes line; and
a tent.

16. A vehicle control unit for generating vehicle attachment point positional data for positioning a vehicle attachment point, the vehicle control unit comprising:
a wireless communication interface to service communication with at least a vehicle network and a handheld mobile device of a vehicle user;
a processor coupled to the wireless communication interface, the processor for controlling operations of the vehicle control unit; and
a memory coupled to the processor, the memory for storing data and program instructions used by the processor, the processor configured to execute instructions stored in the memory to:
retrieve a plurality of object parameters relating to an object that includes at least one tether for removably coupling the object to the vehicle attachment point;
determine a vehicle distance value relative to the vehicle attachment point to accommodate an object distance parameter of the plurality of object parameters;
assess a vehicle environment, via a vehicle-based sensor device, for the vehicle distance value and based on a plurality of vehicle parameters; and
generate vehicle attachment point positional data to position the vehicle attachment point relative to the vehicle environment based on at least the object distance parameter and the vehicle distance value; and
transmit the vehicle attachment point positional data.

17. The vehicle control unit of claim 16, the processor being further configured to execute further instructions stored in the memory to:
sense whether the at least one tether of the object is removably coupled to the vehicle attachment point;
when the at least one tether of the object is coupled to the vehicle attachment point, sense a force vector at the vehicle attachment point and produce force sensor device data therefrom; and
when the force sensor device data exceeds a predetermined threshold value, announce that the force sensor device data exceeds the predetermined threshold value.

18. The vehicle control unit of claim 17, wherein the predetermined threshold value is based on a tensile strength parameter of the plurality of object parameters.

19. The vehicle control unit of claim 16, the processor being further configured to execute further instructions stored in the memory to:
when the at least one tether of the object is coupled to the vehicle attachment point, adjust a tension force value to the object through the vehicle attachment point.

20. The vehicle control unit of claim 19, the processor being further configured to execute further instructions stored in the memory to adjust the tension force value to the object by:
receiving a remote control signal including a tension force control value; and
adjusting the tension force value to the object based on the tension force control value and a feedback of force sensor device data at the vehicle attachment point.

* * * * *